(12) United States Patent
Pratt

(10) Patent No.: US 6,520,736 B2
(45) Date of Patent: Feb. 18, 2003

(54) CARRIER WITH ARTICULABLE BED

(75) Inventor: Thomas A. Pratt, Edinburg, PA (US)

(73) Assignee: Miller Industries Towing Equipment, Inc., Ooltewah, TN (US)

( * ) Notice: Subject to any disclaimer, the term of this patent is extended or adjusted under 35 U.S.C. 154(b) by 0 days.

(21) Appl. No.: 09/892,944

(22) Filed: Jun. 27, 2001

(65) Prior Publication Data

US 2001/0038785 A1 Nov. 8, 2001

Related U.S. Application Data

(60) Division of application No. 09/537,597, filed on Mar. 28, 2000, now Pat. No. 6,276,890, which is a continuation-in-part of application No. 09/057,797, filed on Apr. 9, 1998, now abandoned, which is a continuation-in-part of application No. 08/982,770, filed on Dec. 2, 1997, which is a continuation-in-part of application No. 08/839,393, filed on Apr. 11, 1997, now abandoned.

(51) Int. Cl.[7] ............................................ B60P 1/04
(52) U.S. Cl. ........................................ 414/812; 414/477
(58) Field of Search ................................. 414/480, 494, 414/812, 477, 462, 478, 479, 559, 563

(56) References Cited

U.S. PATENT DOCUMENTS 5,246,329 A * 9/1993 Farrell ........................ 414/480

* cited by examiner

Primary Examiner—Thomas J. Brahan
(74) Attorney, Agent, or Firm—McKee, Voorhees & Sease, P.L.C.

(57) ABSTRACT

An improved method of towing an automotive vehicle is disclosed. The method includes attaching a cable to the vehicle to be towed, lowering a tiltable carrier bed into a hinged position, moving the automotive vehicle to be towed partially onto the carrier bed, moving the tiltable carrier bed from the hinged position to a straight position, and moving the automotive vehicle to be towed onto the tiltable carrier bed such that both axles of the automotive vehicle are supported by the tiltable carrier bed.

5 Claims, 9 Drawing Sheets

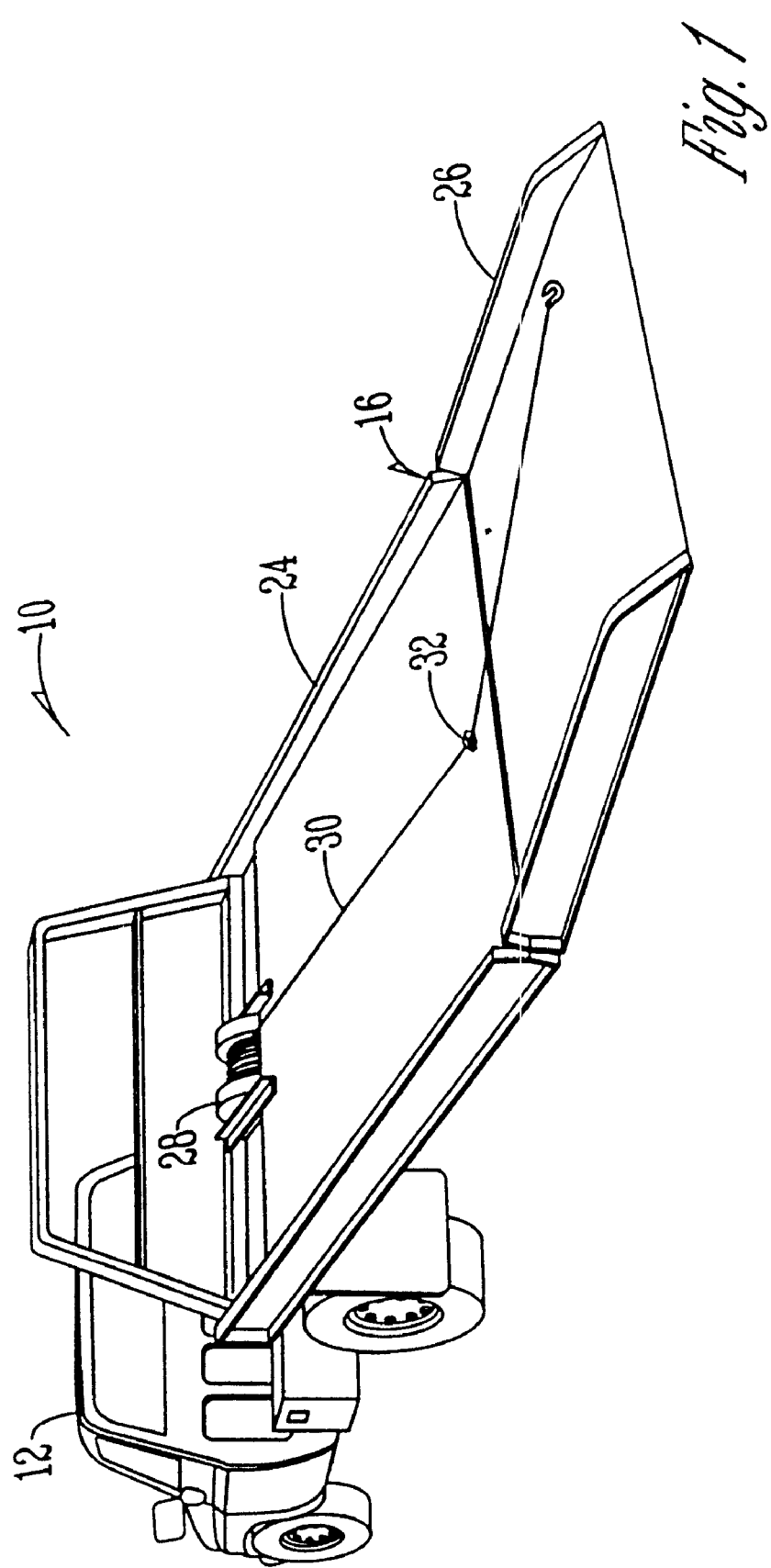

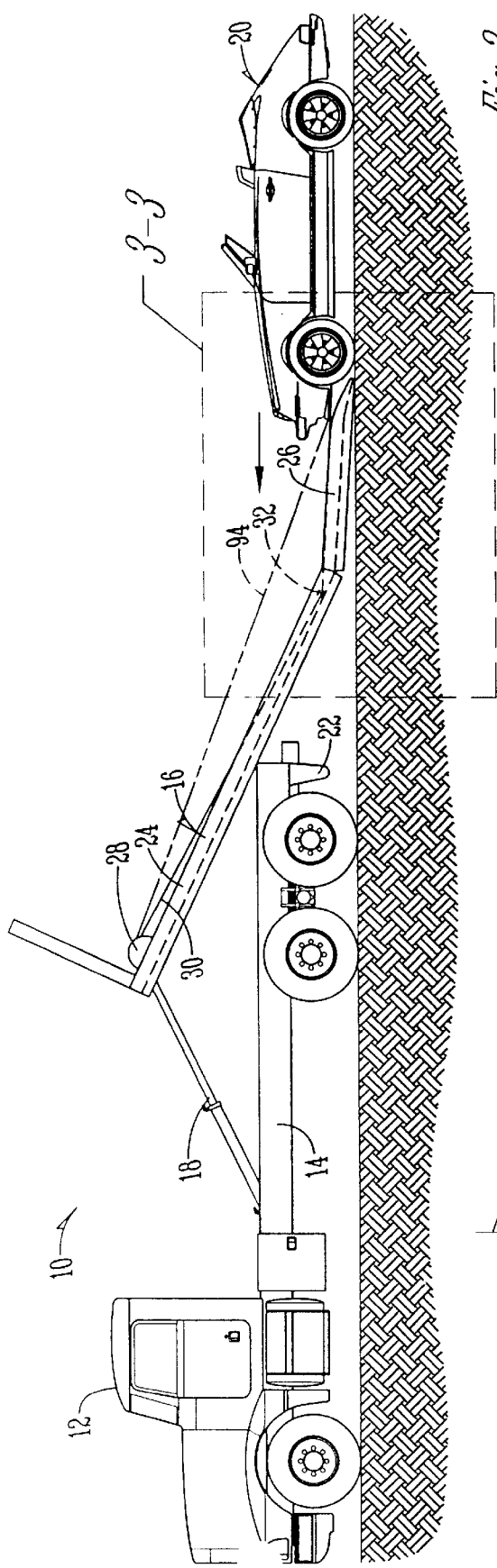
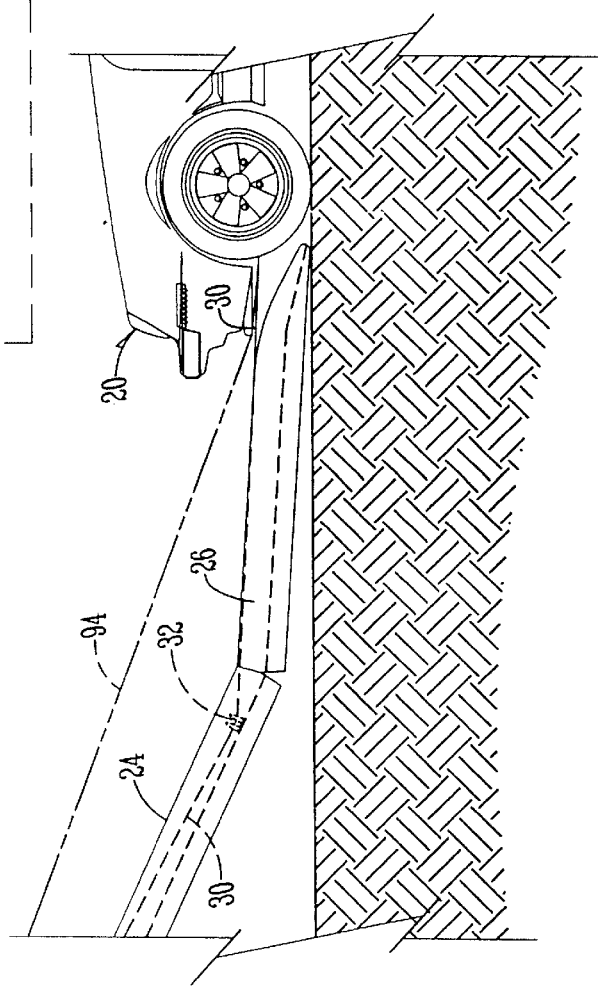

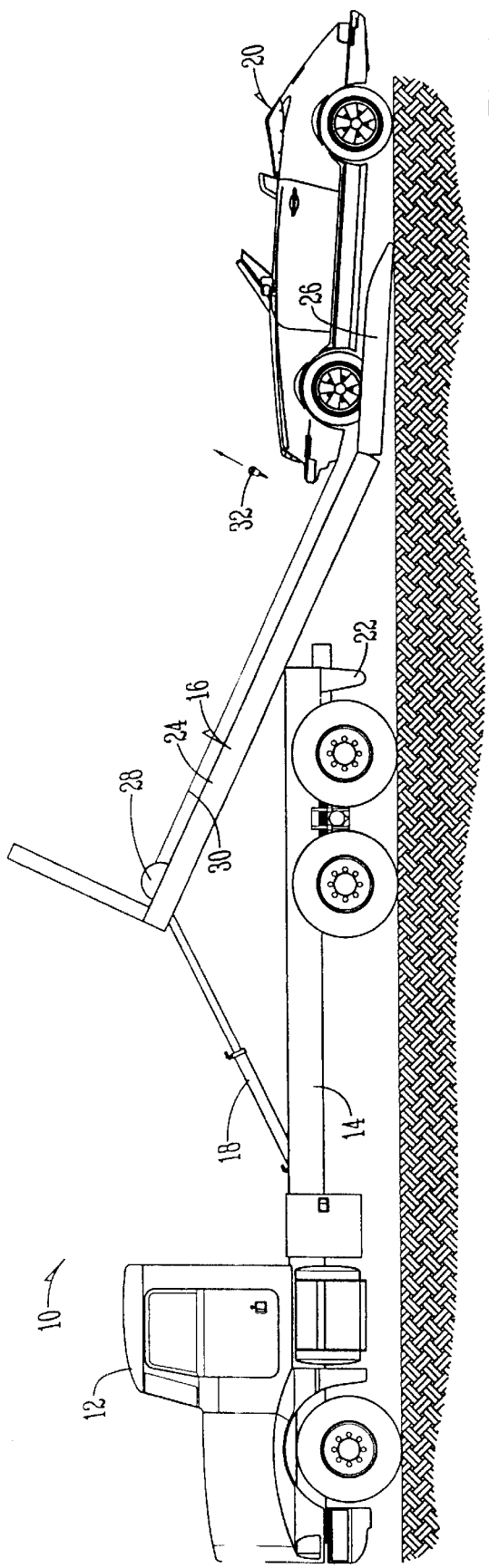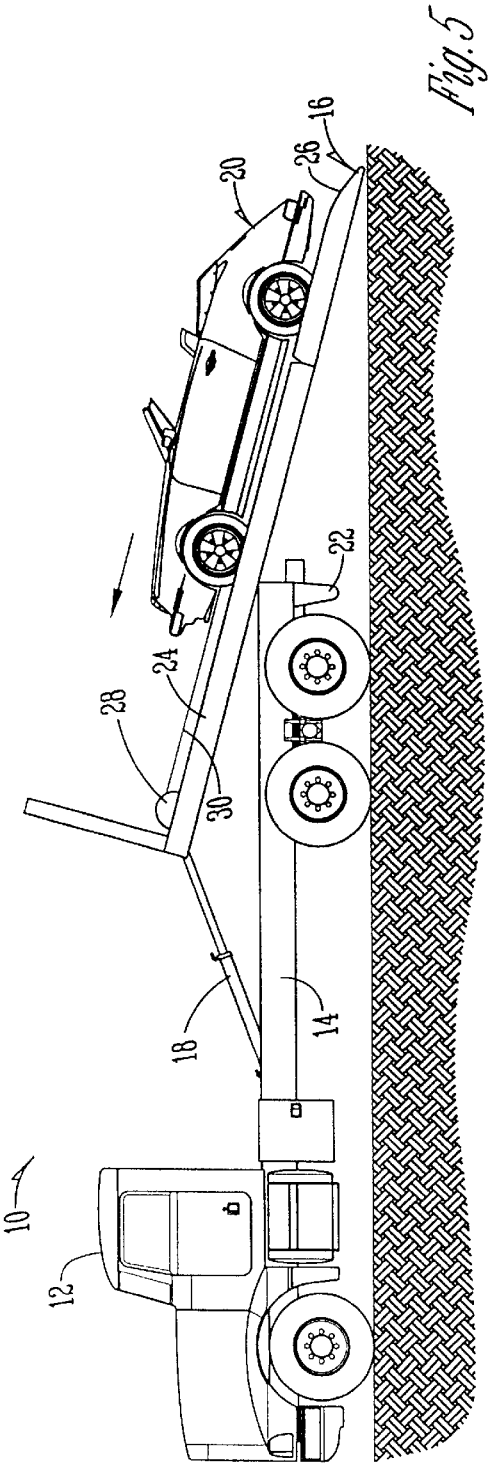

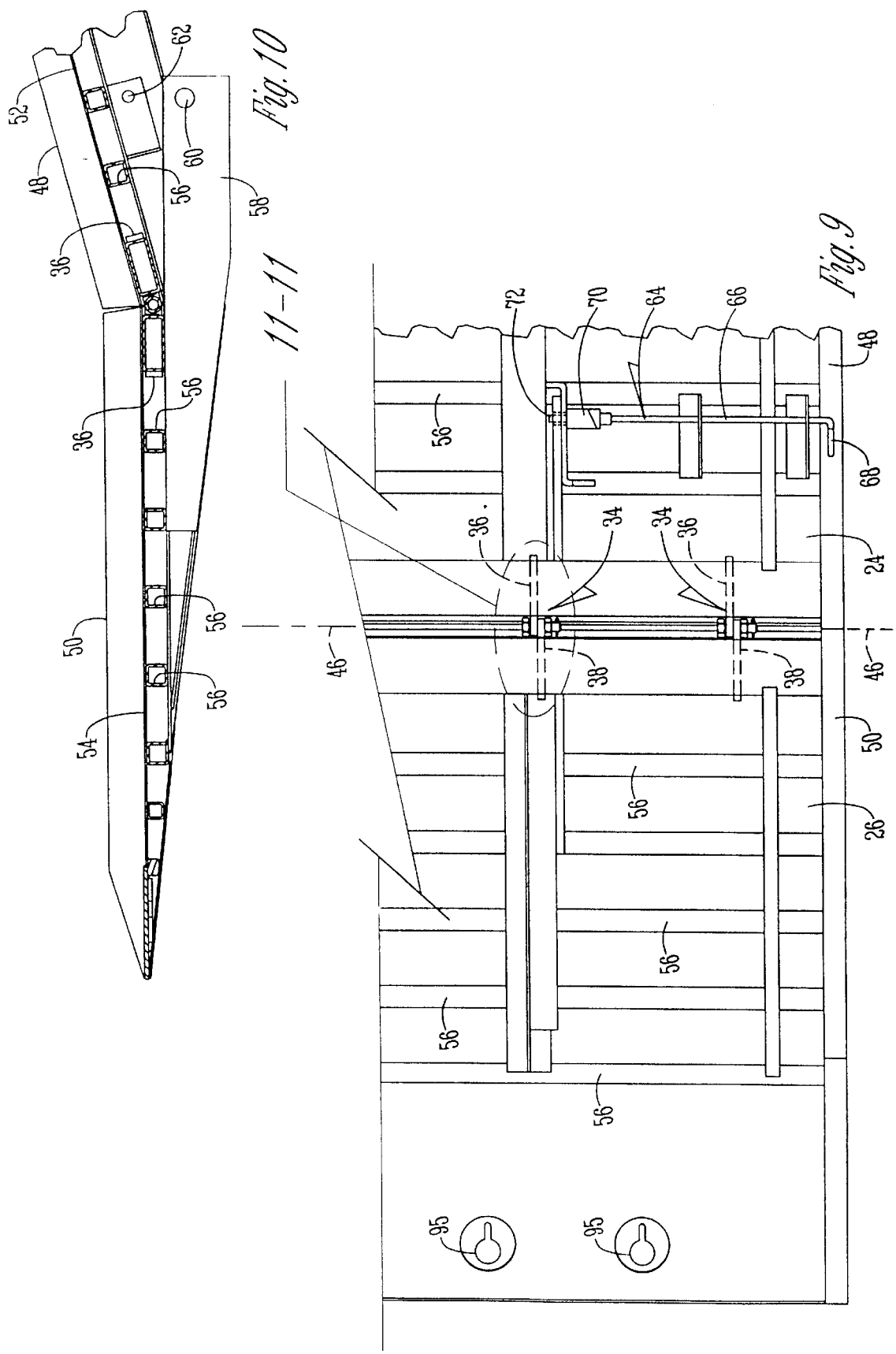

CARRIER WITH ARTICULABLE BED

CROSS-REFERENCE TO A RELATED APPLICATION

This application is a Divisional of U.S. patent application 09/537,597 filed Mar. 28, 2000 now U.S. Pat. No. 6,276,890, which is a continuation-in-part of application Ser. No. 09/057,797 filed Apr. 9, 1998, now abandoned which is a continuation-in-part of application Ser. No. 08/982,770 filed Dec. 2, 1997 and converted to a provisional application Apr. 9, 1998 which was a continuation-in-part of Ser. No. 08/839,393 filed Apr. 11, 1997 now abandoned and converted to a provisional application Apr. 1, 1998.

BACKGROUND OF THE INVENTION

The present invention relates to a carrier for transporting vehicles by placing a vehicle on a platform deck, or bed, and transporting that vehicle to a desired location.

In some situations, it is desirable to carry a vehicle, as opposed to towing that vehicle in a conventional manner. These situations include when the vehicle to be towed is severely damaged and perhaps missing an axle or when the owner of an automobile wishes to transport the same over a greater than average distance. The carrier found in the prior art typically includes a platform deck or bed carried on a truck chassis. The bed is capable of moving rearwardly away from the chassis and can then incline down to the ground into a vehicle loading position. In the vehicle loading position, the bed forms a ramp onto which the vehicle can be winched, driven, or placed thereon by other conventional techniques.

At the present time, there are several disadvantages associated with the prior art to which this patent application is addressed. For example, it is crucial that the angle between the bed and the ground be as small as possible. This angle is known as the approach or load angle. The lower the angle of incline on the bed, the easier it becomes to load a vehicle to be towed, especially given modern vehicles low ground clearance and the longer nose of older automobiles. Given the variety of different vehicle configurations, a lower bed angle, or approach angle, is desirable.

In the past, carrier operators have solved the problem of approach angles with make-shift methods such as ramps and wood planks. These are cumbersome and difficult to store.

Another problem associated with the prior art is that the winch cable which may be used to pull the vehicle to be towed onto the bed is often undirected and given the variety of approach angles necessary, the winch cable may cause damage to the vehicle to be towed. Although hinged beds have been used in Europe primarily, they did not have the benefits of a conventional deck and caused severe damage with their cables should a tow hook not be provided on the automobile. Two hooks are uncommon on automobiles in the United States and damage is common with a winch cable. This problem is exasperated with the addition in modern automotive design of low profile automobiles having ground effects such as air dams which could interfere in the direction of the cable.

SUMMARY OF THE INVENTION

The present invention is directed to a uniquely constructed carrier that overcomes the disadvantages associated with prior art devices. The present invention is a car carrier that includes a bed that is hinged or articulable such that the approach angle of the carrier is substantially minimized. Because the bed of the present invention is hinged, the rear plate of the bed can be moved to a position adjacent the vehicle to be towed in a lower angle than that found in the prior art. In addition, because the bed is hinged, a cable guide is provided that directs the cable along the bed, thereby eliminating any interference with ground effects of the vehicle to be towed. The bed can also be locked in a position for use as a conventional carrier. The carrier is outfitted conventionally to include a wheel lift or underlift for towing a second automobile and the advantages are achieved by means of a relatively simple and cost effective, reliable design. As a result, the carrier of the present invention provides damage free operation and is more versatile than known prior art carriers.

It is, therefore, an object of this invention to provide a carrier whereby a vehicle to be towed may be loaded and moved so that no additional damage will result to the vehicle.

Another object of this invention is to provide a carrier that includes a bed capable of reducing the load or approach angle when a vehicle to be towed is loaded.

A further object of this invention is to provide a carrier with a cable guide so that winch cable used to load the vehicle to be towed onto the bed cannot cause further damage thereto.

A still further object of this invention is to provide a carrier that can be use in a conventional manner, as well as in a hinged fashion.

BRIEF DESCRIPTION OF THE FIGURES OF THE DRAWINGS

FIG. 1 is a perspective view of the carrier of the present invention showing the bed extended and in the loading position.

FIG. 2 is a side elevation showing the carrier with the bed in the extended and loading position relative to a vehicle to be towed.

FIG. 3 is a side elevation taken from box 3—3 of the FIG. 2.

FIG. 4 is a side elevation showing the vehicle in an extended and loading position with the vehicle to be towed positioned on the first stage of the bed.

FIG. 5 is a side elevation showing the carrier having the bed in the extended position and the vehicle to be towed is located entirely on the bed.

FIG. 8 shows the locking mechanism which has two independent locks, one on each side of the bed.

FIG. 9 is a view of the plunger lock from underneath the carrier. This plunger lock is used in the embodiment shown in FIG. 8.

FIG. 10 is a side sectional of the rear portion of the bed.

FIG. 12 shows the locking mechanism which has one handle for releasing both plunger locks.

DETAILED DESCRIPTION OF THE PREFERRED EMBODIMENT

Figure 8:
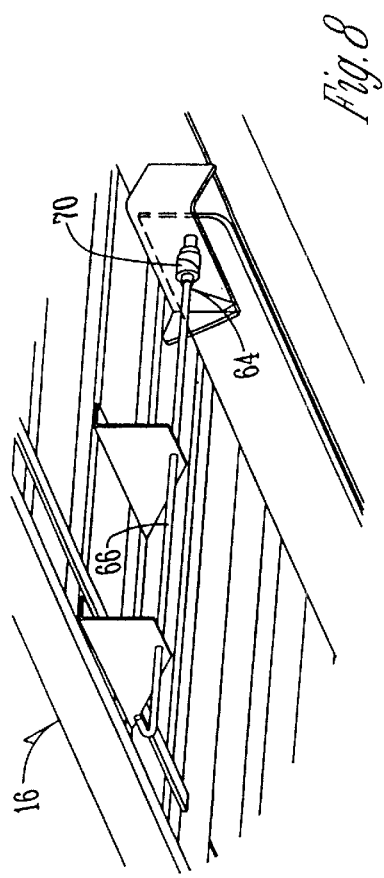
FIG. 8 is a perspective view of the underside of the carrier showing one embodiment of the locking mechanism to prevent the bed from hingeable movement when desired.

Referring to the drawings, and more particularly to FIG. 2, the carrier 10 of the present invention includes a cab 12 and chassis 14. It is anticipated that the invention is adaptable both to a single axle chassis (as shown in FIG. 1) as well as a multiple axle chassis (as shown in FIG. 2). The bed 16 is mounted on the chassis (on a sub-frame not shown) and is capable of movement horizontally as well as provided with a hydraulic tilt mechanism 18 which tilts the bed 16 about a pivot (not shown). The vehicle to be towed 20 is also shown on FIG. 2.

Likewise, as in conventional carriers, carrier 10 is provided with an underlift or wheel lift 22 which is capable of towing a vehicle not positioned on bed 16. Bed 16 includes a front section 24 and a rear section 26. Bed 16 is also provided with a winch 28 and a cable 30. Cable guide 32 directs cable 30 along the surface of an articulated or hinged bed 16.

Figure 11:
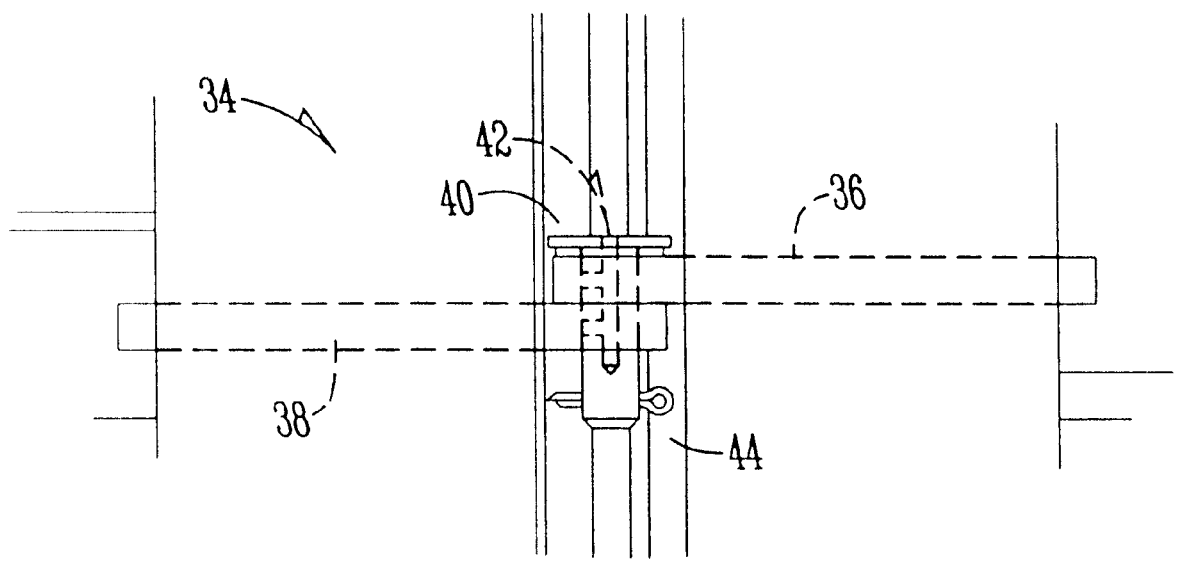
FIG. 11 is a close up view taking from circle 11—11 of FIG. 9.

The structure of the bed 16 is best shown in detail views contained in FIGS. 9 through 11. FIG. 9 shows the underside of bed 16. As mentioned previously, the front section 24 of bed 16 and rear section 26 of bed 16 are connected by a series of hinges 34, as best shown in FIG. 11. Hinges 34 are comprised of a front hinge bar 36 and a rear hinge bar 38. Front hinge bar 36 is welded to the front section 24 of bed 16. Rear hinge bar 38 is welded to rear section 26 of bed 16.

These hinge bars 36, 38 are positioned on the sections of the bed 24, 26 such that they line up as shown in FIG. 11. A bore is positioned at the end of each hinge bar 36, 38 so that a greasable hinge pin 40 will be positioned therethrough and provide an axis for hinged movement of the hinge bars 36, 38. The hinge bars 36, 38 are rounded at the end through which the pin 40 passes. Pin 40 is provided with an internal bore 42 adapted to receive a grease fitting. Bore 42 branches off and, when grease is applied into the fitting, bars 36, 38 are greased at their respective pivot points. Cotter pin 44 is positioned through pin 40 for securement. There are five of these hinges 34 disposed along the fold line 46 of the bed 16.

The support structure of the rear section 26 of bed 16 is best shown in FIG. 10. Bed 16 includes front side rails 48 and rear side rails 50. Also included is front floor plate 52 and rear floor plate 54. Support tubing 56 is attached thereto for added strength. Beam 58 is primarily attached to the rear section 26 of bed 16 and extends forward beyond hinges 34 so that when the bed 16 is in a flat or linear orientation, beam 58 contacts front section 24 of bed 16 to prevent rear section 26 from folding downwardly or beyond a planar relation between the front floor plate 52 and the rear floor plate 54. Beam 58 also includes aperture 60 for receiving the cam lock means described below. A second coaxial aperture 62 is located in a fixed position on the front section 24 of bed 16.

The locking mechanism is best described by viewing FIGS. 8 and 9. In order to prevent the bed 16 from moving in a hingeable fashion when such movement is not desired, the present invention provides a plunger lock on each side of the bed to fix the bed in a conventional orientation. Lock 64 is comprised of a lock control rod 66 that has a handle 68 placed adjacent the front side rails 48 to enable an operator to actuate the locking mechanism. A cam lock 70 of the type known in the prior art is provided at the end of the lock control rod 64 opposite handle 68. By turning lock control handle 68, the cam lock pin 72 is retracted allowing the rear section 26 of bed 16 to pivot on its hinges 34. Cam lock pin 72 extends into apertures 60 and 62 preventing movement when engaged.

The cable guide 32 is disposed in the front floor plate 52 and is removably attached through a keyhole 74 in a housing box contained in the floor plate. The cable guide 32 is comprised of a pair of oppositely oriented hooks 76 welded to a T-shaped key 78. The T-shaped key member 79 is adapted to be positioned through keyhole 74 and rotated to a operative position such that cable 30 would extend longitudinally along bed 16 when disposed through the hook 76. Cable guide 32 remains rotatable within keyhole 74, and can be removed by rotating cable guide 32 to line up the T-shaped member 78 with keyhole 74, or 90 degrees. The cable guide 32 may be constructed from a single manufacture or by welding or otherwise joining the various elements together.

In operation, and when used as a hinged bed, bed 16 is lowered and moved to a position as shown in FIG. 2 adjacent the vehicle to be towed 26. The tiltable carrier bed 16 is aligned with the vehicle to be towed 26 as shown in FIG. 2. When the rear section 26 of the bed 16 is hinged, the approach angle is approximately 6 degrees.

Cable 30 is then strung through cable guide (as shown in FIG. 1) and attached to a tow hook or other structure underneath the vehicle to be towed 20. Without cable guide 32, the dotted line 94 in FIGS. 2 and 3 shows the path that the cable would travel from the winch 28 to the vehicle to be towed 20. Should the cable 30 not be threaded through cable guide 32 before attachment to the vehicle, it may be possible to damage the vehicle to be towed 20 due the relative angle of bed 16 and cable 30.

Once the vehicle to be towed 20 is attached to cable 30, the vehicle to be towed 20 can be moved to a first position wherein its front wheels are located on the rear section 26 of bed 16. At this point, cable guide 32 can be removed from grommet 74 (as shown in FIG. 4) and the vehicle to be towed 20 can be moved forwardly along bed 16 as shown in FIG. 5. Prior to movement of the vehicle to be towed forwardly, the bed is moved to a second position where, although still inclined, the angle between the rear section 26 and front section 24 is eliminated thereby providing a planar relationship between front section 24 and rear section 26 of bed 16. At this point, bed 16 may be locked in this planar position. The vehicle can then moved forward to its foremost position.

Figure 6:
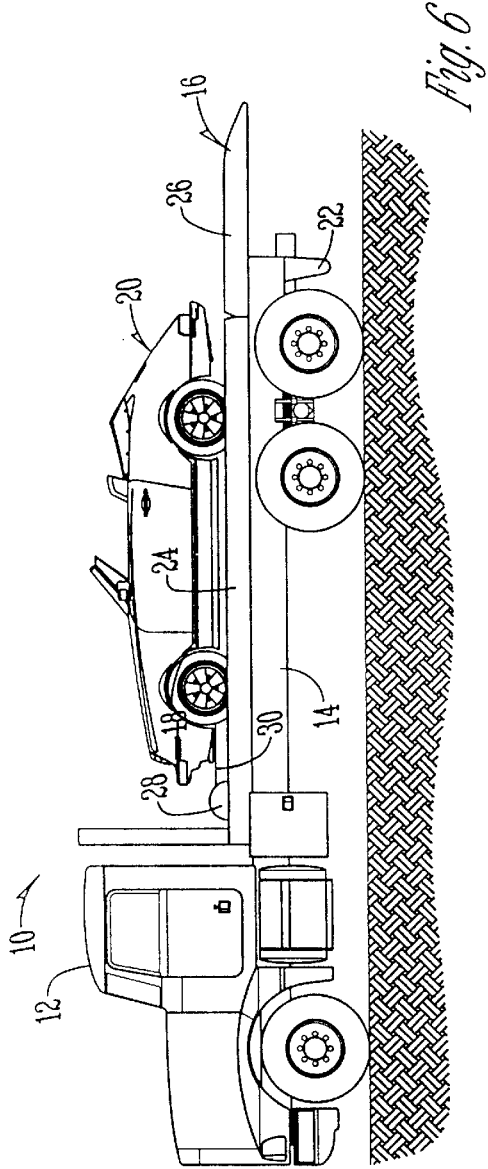
FIG. 6 is a side elevation with the bed in the carrying position.
Figure 7:
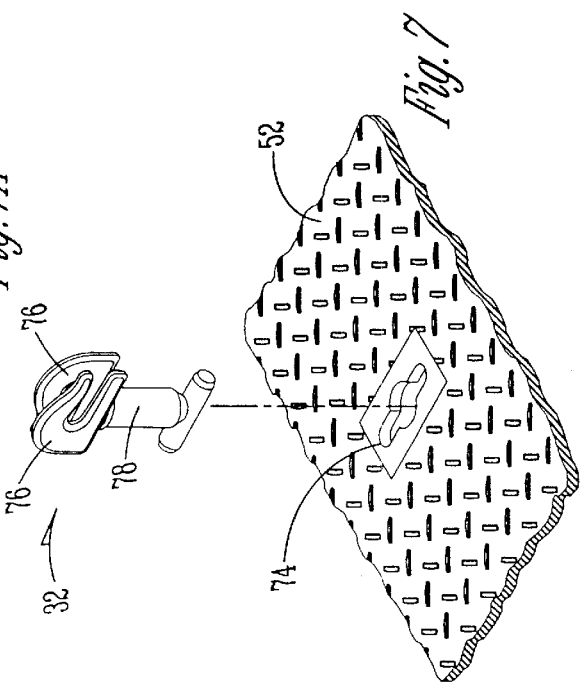
FIG. 7 is an exploded perspective view of the cable guide found in the bed of the carrier.
Figure 7A:
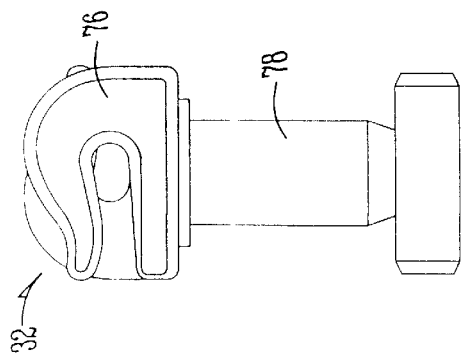
FIG. 7A is a side view of the cable guide.

As shown in FIG. 6, the vehicle to be towed 20 is in its foremost position. When it is safe and feasible, the bed can be lowered to this stored or carrying position and the vehicle to be towed 20 can be locked and secured to the bed. For example, the vehicle can be tied down by threading chains through eyelets 94 when fully secured, the vehicle 20 can be taken to its intended destination.

Figure 12:
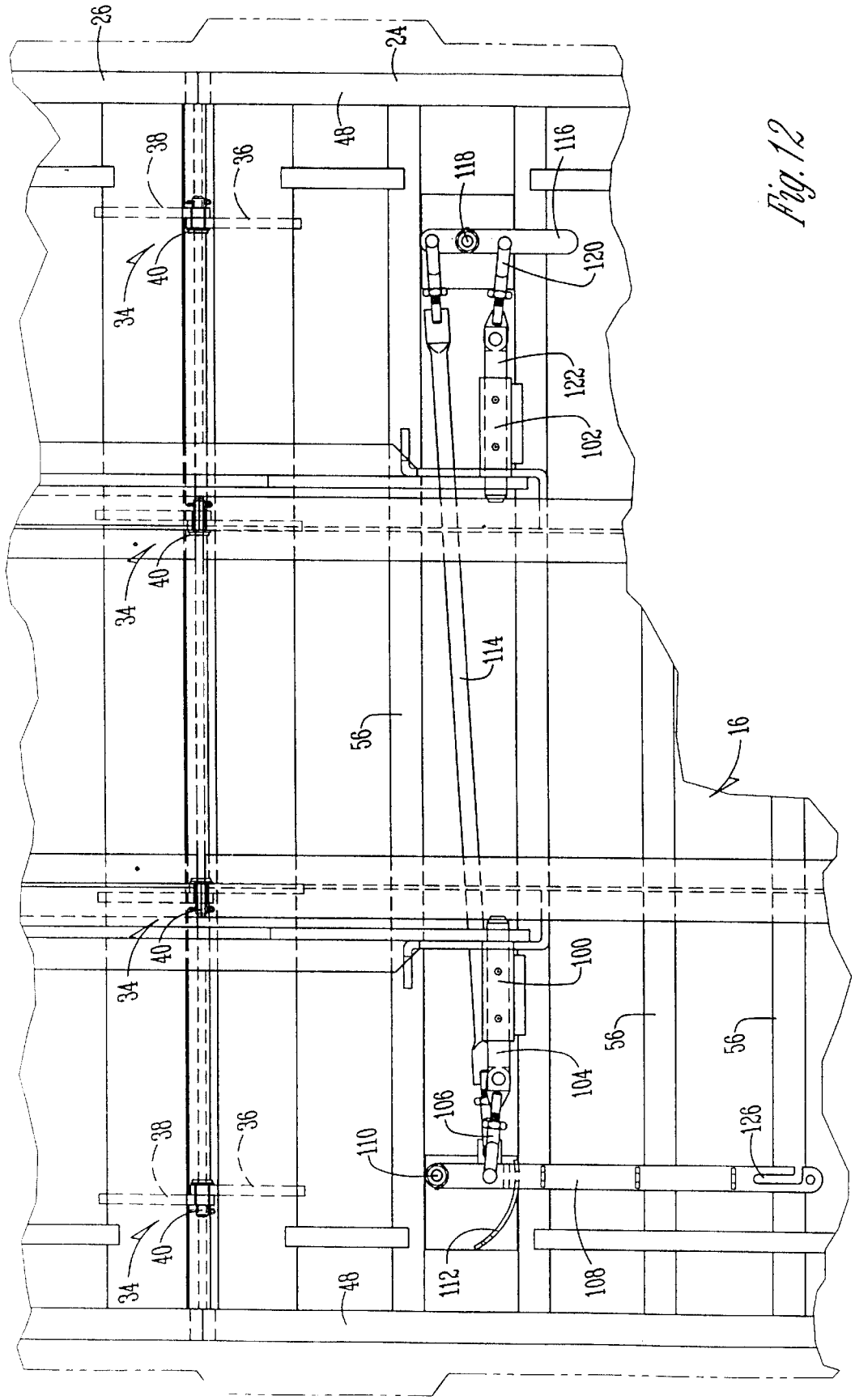
FIGS. 12 and 13 are underside views of the second embodiment of the locking mechanism.
Figure 13:
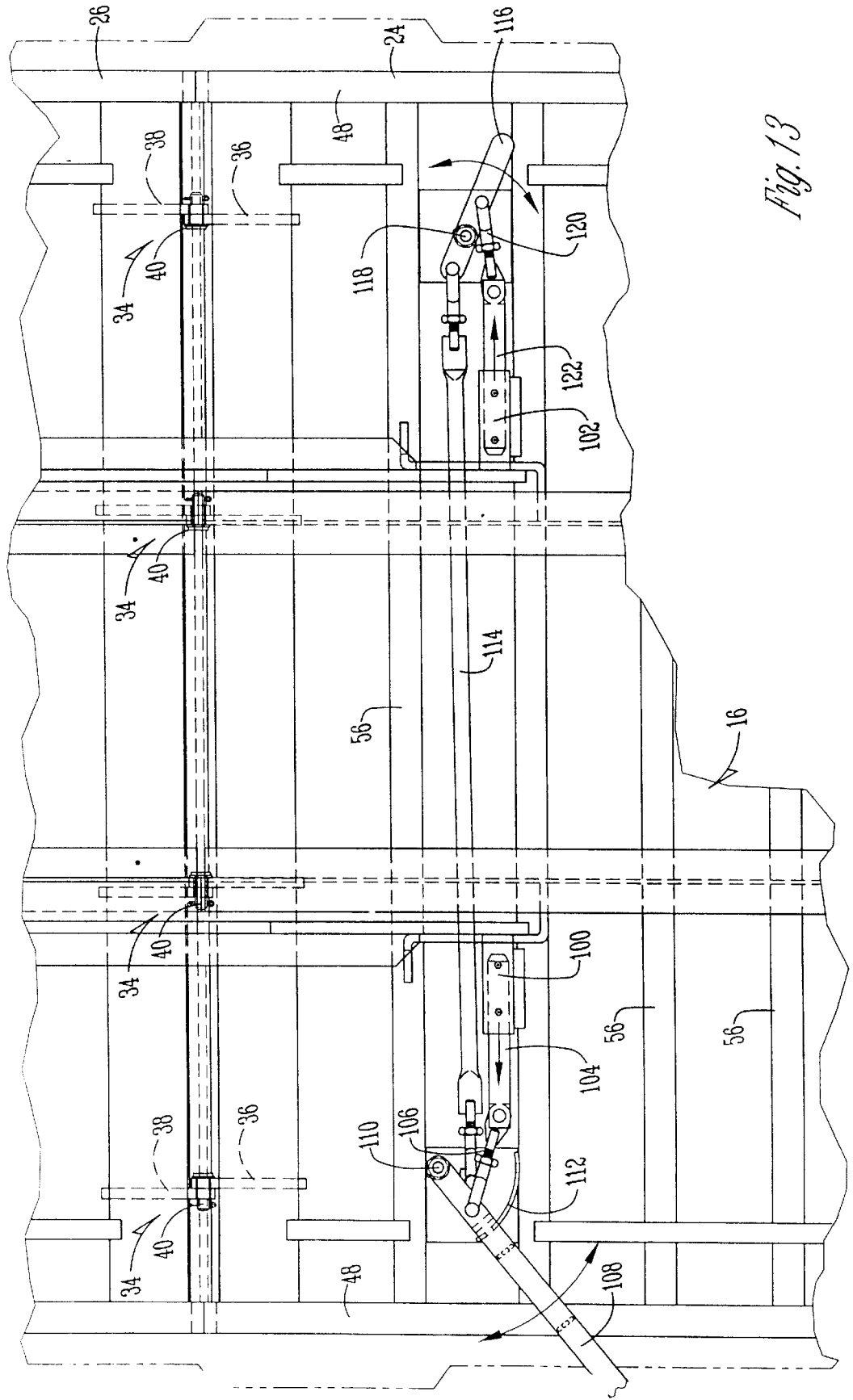
Figure 14:
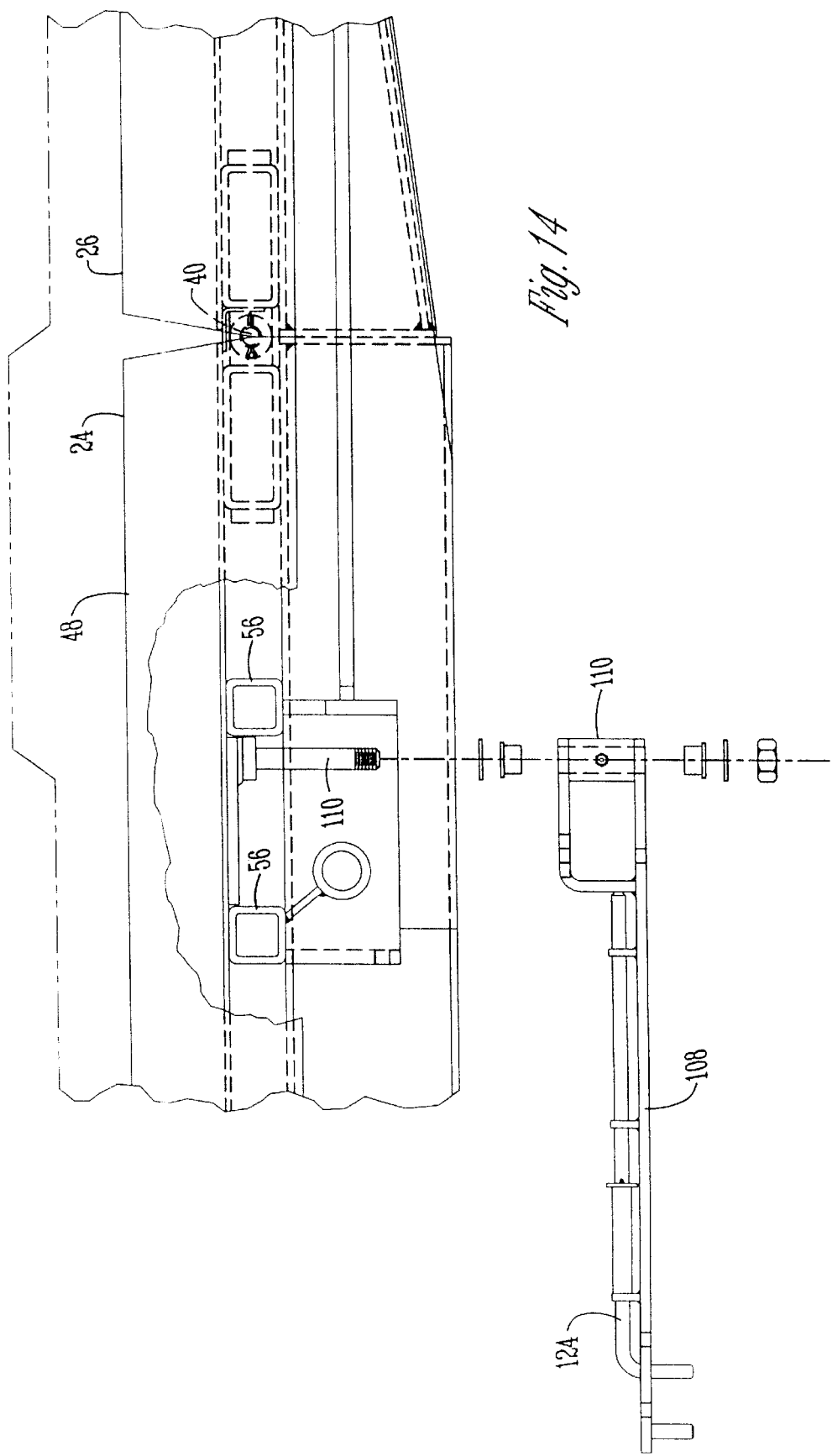
FIG. 14 is an elevational exploded view of the present invention also shown in FIG. 12.

An alternative and preferred embodiment of the present invention is shown in FIGS. 12 through 14. In contrast with the first embodiment, shown best in FIGS. 8 and 9, which require that an operator go to each side of the bed in order to separately unlock the two independent lock control rods 64, the second embodiment, best shown in FIGS. 12 and 13, requires that the operator only unlock a single handle located on the driver's side of the carrier bed. As shown in FIGS. 12 and 13, the carrier 10 has two connected lock pins 100, 102. Driver side lock pin 100 is connected by linkage 104 to clevis 106. Clevis 106 is connected to the linkage control arm 108 in a pivotable fashion. Linkage control arm 108 pivots around point 110.

When actuated by an operator, control arm 108 travels about point 110 along path 112. The linkage control arm 108 is also connected to the center linkage 114. Movement of the linkage control arm 108 along path 112 to a disengaged position causes center linkage arm 114 to disengage the passenger side lock pin 102. Center linkage arm 114 causes the passenger side linkage control arm 116 to disengage the passenger side lock pin 102 by pivoting the passenger side linkage control arm 116 about pivot point 118 by pulling linkage control arm 108, as shown in FIG. 12, linkage control arm 116 is rotated counterclockwise about point 118 which pulls clevis 120 and linkage 122, thereby disengaging the passenger side lock pin 102.

The disengagement of the passenger side lock pin 102 and the driver side lock pin 100 is accomplished at an approximate simultaneous time so that both lock pins are disengaged to allow the hinged portion of carrier bed 10 to pivot freely. The driver side linkage control arm 108, when the lock pins 100, 102 are disengaged, sticks out from the side of the carrier 10 so as to be obviously unlocked and gives a visual signal by its location that the hinged bed is not locked in planar position. This position of the linkage control arm 108 is shown best in FIG. 13 as the unlocked or disengaged position. Position pin 124 is positioned and shaped to guide the driver side linkage control arm 108 to a locked position when the lock pins 100, 102 are engaged. Position pin 124 is guided on linkage control arm 108 in cutout 126.

Although the figures show both a single axle and tandem axle chassis, the invention is not limited to any particular chassis style or arrangement.

Thus, an improved carrier is disclosed having a hinged bed capable of being locked in a planar orientation and provided with a cable guide to maximize the advantage of having an articulated bed without causing damage to the vehicle to be towed. From the foregoing, it will be observed that numerous variations and modifications may be affected without departing from the true spirit and scope of the novel concept of the present invention. It will be understood that no limitation with respect to the specific embodiment illustrated herein is intended or should be inferred. The terms and expressions which have been employed herein are used our terms of description now limitation, and there is no intention in the use of such terms and expressions, of excluding any equivalents of the future shown and described or portions thereof, but it is recognized that various modifications are possible within the scope of the invention now claimed.

What is claimed is:

1. A method of towing an automotive vehicle using a carrier having a truck chassis and a tiltable carrier bed tiltably connected to the truck chassis comprising the steps of:

(a) tilting the tiltable carrier bed;
   (b) lowering the tiltable carrier bed into a hinged position;
   (c) aligning the tiltable carrier bed with the vehicle to be towed;
   (d) attaching a cable between the automotive vehicle to be towed and the tiltable carrier bed;
   (e) holding the cable in a position adjacent the tiltable carrier bed using a releasable cable guide to restrict vertical movement of the cable away from the tiltable carrier bed such that the vehicle to be towed is not damaged;
   (f) moving the automotive vehicle to be towed partially onto the tiltable carrier bed;
   (g) releasing the cable from the releasable cable guide;
   (h) moving the tiltable carrier bed from the hinged position to a straight position; and
   (i) moving the automotive vehicle to be towed onto the tiltable carrier bed such that both axles of the automotive vehicle are supported by the tiltable carrier bed.

2. The method of claim 1 further comprising the step of holding the cable in a position adjacent the carrier bed using a releasable cable guide.

3. The method of claim 2 further comprising removing the releasable cable guide.

4. The method of claim 2 further comprising the step of attaching the cable to a cable guide located in the tiltable carrier bed.

5. The method of claim 1 wherein the step of tilting is extending the carrier bed in a rearward direction to an inclined position.

* * * * *